(12) United States Patent
Adams et al.

(10) Patent No.: US 12,323,574 B2
(45) Date of Patent: Jun. 3, 2025

(54) SENSOR CALIBRATION VALIDATION

(71) Applicant: Zoox, Inc., Foster City, CA (US)

(72) Inventors: Derek Adams, Pasadena, CA (US); Zakieh Sadat Hashemifar, Sunnyvale, CA (US); Agis Iakovos Mesolongitis, Oakland, CA (US)

(73) Assignee: Zoox, Inc., Foster City, CA (US)

( * ) Notice: Subject to any disclaimer, the term of this patent is extended or adjusted under 35 U.S.C. 154(b) by 541 days.

(21) Appl. No.: 17/739,530

(22) Filed: May 9, 2022

(65) Prior Publication Data

US 2024/0098245 A1 Mar. 21, 2024

(51) Int. Cl.
| | |
|---|---|
| G06K 9/03 | (2006.01) |
| G06T 7/80 | (2017.01) |
| H04N 17/00 | (2006.01) |
| B60W 50/02 | (2012.01) |

(52) U.S. Cl.
CPC ............ *H04N 17/002* (2013.01); *G06T 7/80* (2017.01); *B60W 2050/0215* (2013.01); *B60W 2420/403* (2013.01); *G06T 2207/10024* (2013.01); *G06T 2207/10028* (2013.01); *G06T 2207/20076* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 9,916,703 B2 * | 3/2018 | Levinson | G01S 17/931 |
| 10,607,371 B2 * | 3/2020 | Wakai | G06T 7/73 |
| 10,705,194 B2 * | 7/2020 | Pfeiffer | G01S 17/87 |

(Continued)

FOREIGN PATENT DOCUMENTS

| | | | |
|---|---|---|---|
| CN | 113808217 A | * 12/2021 | |
| KR | 20210114530 A | 9/2021 | |
| WO | WO-2021233309 A1 | * 11/2021 | G01C 21/165 |

OTHER PUBLICATIONS

Jiao et al., "Robust Odometry and Mapping for Multi-LiDAR Systems With Online Extrinsic Calibration," in IEEE Transactions on Robotics, vol. 38, No. 1, pp. 351-371, Feb. 2022 (Year: 2022).*

(Continued)

*Primary Examiner* — Feng Niu
(74) *Attorney, Agent, or Firm* — Lee & Hayes, P.C.

(57) ABSTRACT

Techniques for determining a probability that a first sensor is miscalibrated with respect a second sensor are discussed herein. For example, a computing device may receive calibrated extrinsics of a camera to a lidar, determine a plurality of sets of perturbed extrinsics based on the calibrated extrinsics, determine respective costs for perturbed extrinsics of the plurality of sets of perturbed extrinsics based on image data captured by the camera, the plurality of sets of perturbed extrinsics, and lidar data captured by the lidar, and determine a local maxima score for the calibrated extrinsics based at least in part on the respective costs for the perturbed extrinsics of the plurality of sets of perturbed extrinsics and a cost of the calibrated extrinsics. The computing device may then determine a probability that the camera is miscalibrated based on a Bayes probability and the local maxima score.

20 Claims, 7 Drawing Sheets

(56) References Cited

U.S. PATENT DOCUMENTS

| | | | | |
|---|---|---|---|---|
| 10,726,579 | B1* | 7/2020 | Huang | G01S 7/4972 |
| 10,733,761 | B2* | 8/2020 | Kroeger | G06T 7/85 |
| 10,830,871 | B2* | 11/2020 | Blaes | G01S 7/4026 |
| 10,854,165 | B2* | 12/2020 | Chi | H04N 13/246 |
| 10,859,684 | B1* | 12/2020 | Nabatchian | G06T 7/13 |
| 11,394,872 | B2* | 7/2022 | Jia | G06T 7/80 |
| 11,656,329 | B2* | 5/2023 | Blaes | G01S 7/4026 |
| | | | | 342/71 |
| 12,092,771 | B2* | 9/2024 | Couture | G06T 7/80 |
| 2017/0124781 | A1 | 5/2017 | Douillard et al. | |
| 2018/0300900 | A1* | 10/2018 | Wakai | G06T 7/85 |
| 2019/0197982 | A1* | 6/2019 | Chi | H04N 13/239 |
| 2019/0293756 | A1* | 9/2019 | Blaes | G01S 7/4026 |
| 2019/0293772 | A1 | 9/2019 | Pfeiffer | |
| 2020/0005489 | A1* | 1/2020 | Kroeger | G06T 7/85 |
| 2021/0055380 | A1 | 2/2021 | Blaes et al. | |
| 2021/0065473 | A1 | 3/2021 | Diehl et al. | |
| 2021/0112190 | A1* | 4/2021 | Jia | G06T 7/85 |
| 2021/0215811 | A1* | 7/2021 | Couture | G05D 1/628 |
| 2024/0106998 | A1* | 3/2024 | Sokol | G06T 19/006 |

OTHER PUBLICATIONS

The PCT Search Report and Written Opinion mailed Aug. 31, 2023 for PCT Application No. PCT/US23/21165, 13 pages.

* cited by examiner

SENSOR CALIBRATION VALIDATION

BACKGROUND

A vehicle can use sensors to capture sensor data to detect objects in an environment. Accurate determinations of object characteristics can assist, for example, a vehicle to traverse the environment. However, the quality of the data collected by sensors may become degraded in certain circumstances, including based on environmental factors such as weather, traffic, or road conditions, as well as based on miscalibration, internal errors or malfunctions that may occur within the sensors themselves. In such cases, the data collected by the vehicle sensors may be suboptimal or even unsuitable for use, potentially impacting vehicle navigation, obstacle detection and avoidance, and other vehicle functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
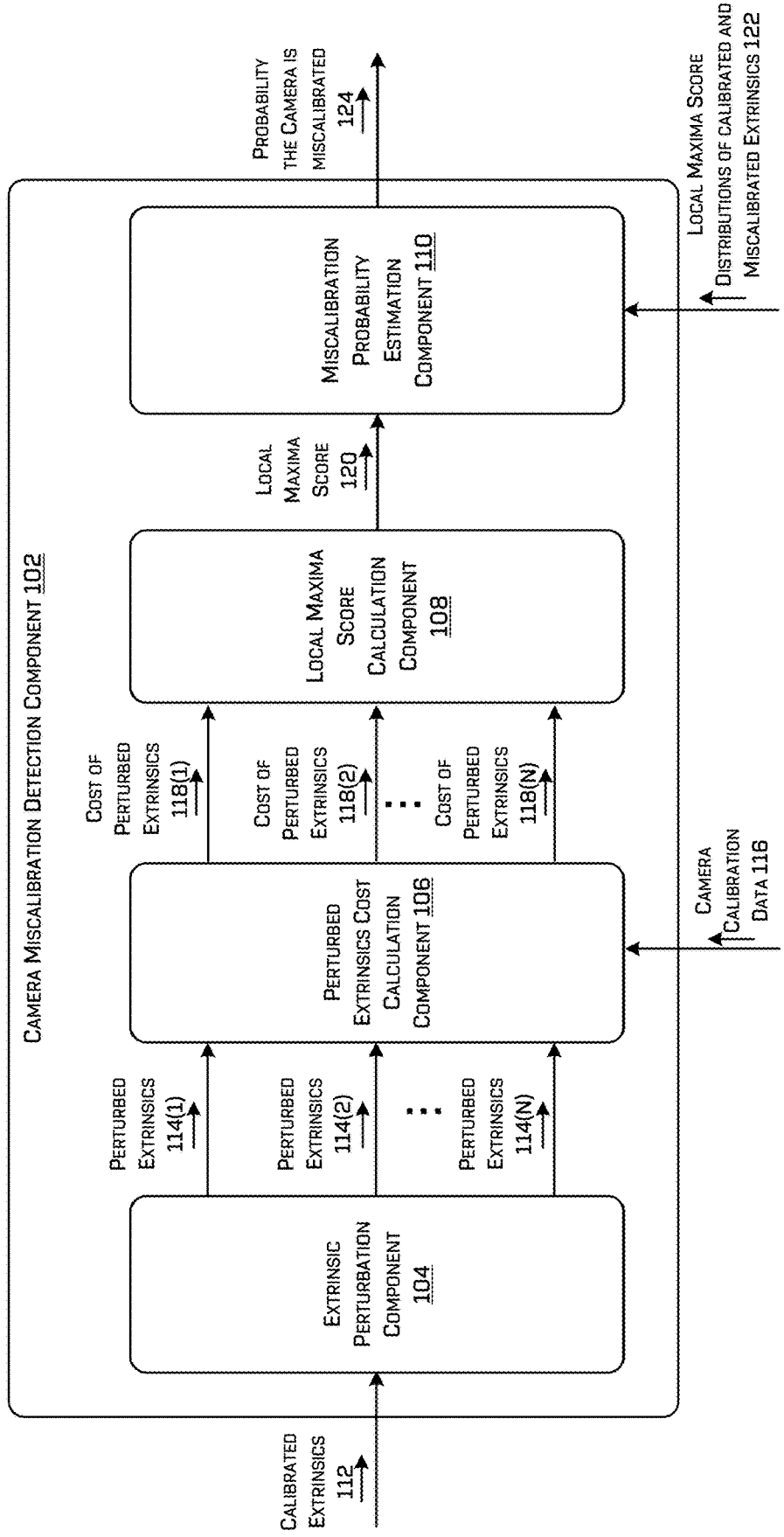
FIG. 1 is an illustration of an example diagram in which an example camera miscalibration detection component may determine a probability that a sensor is miscalibrated.

Computing devices and techniques according to this disclosure may determine a probability that a first sensor is miscalibrated with respect a second sensor (e.g., such as whether a camera is well-aligned with a lidar). Such sensors may include, but are not limited to, an image sensor, a lidar sensor, a time-of-flight sensor, a radar sensor, a sonar sensor, and the like.

A computing device may receive a calibrated camera dataset including, for example, camera calibration data including, for example, calibrated extrinsics of one or more cameras (such extrinsics indicating a relative rotation and/or translation relative to a particular coordinate frame). In some examples, the calibrated extrinsics for a camera may include multiple parameters or dimensions such as roll, pitch, and yaw Euler angle rotations and/or the x, y, and z translations between the camera and another sensor (e.g., lidar) and/or to a common reference frame. In some examples, some parameters or dimensions of the camera extrinsics may be known or predetermined. For example, the translations between a camera and a lidar may be known and may not need to be calibrated (e.g., the relative location of the camera and the lidar may be fixed). The camera calibration data may include data used in calibration of the one or more cameras, which may be raw or processed. For example, the camera calibration data for calibration of cameras with a lidar may include camera edgemap images (e.g., identified regions of discontinuities of image data, such as edges between objects) and the corresponding lidar edges (e.g., portions of the lidar image associated with depth discontinuities). Alternatively, the camera calibration data for calibration of cameras with a lidar may be camera images and raw Lidar data that covers a field of view at least partially overlapping the camera field of view. Further, the camera calibration data may include a cost determined for the calibrated extrinsics during calibration.

When validating the calibration of a sensor, the computing device may generate a set of perturbed extrinsics based on the calibrated extrinsics of the sensor. For example, to validate the roll (r), pitch (p), and yaw (y) Euler angle rotations of the calibrated extrinsics, the set of perturbed extrinsics may include combinations of the extrinsics varied over a range with a given step size. In a particular example, the perturbed extrinsics may combinations of extrinsics over a ±1 degree range for the dimensions of [r, p, y], with a 0.1 degree step size. Of course, neither the range nor the step size is not limited to 0.1 degrees and may be other values such as 0.5, 0.3, 0.2, 0.05 degrees, and the like.

The computing device may then determine respective costs for the perturbed extrinsics of the set of perturbed extrinsics based on the camera calibration data. In some examples, the cost determination may be the same as a cost determination utilized to determine the calibrated extrinsics during calibration of the camera. In some examples, the cost determination between a camera and a lidar may be determined based on distance between edges in camera edgemap images and the corresponding lidar depth discontinuities when the edges in the camera edgemap images are offset by the roll (r), pitch (p), and yaw (y) Euler angle rotations of the perturbed extrinsics. For example, the cost determination may be a cumulative square distance error determination. However, examples are not so limited and one of ordinary skill in the art would be aware of alternative cost determination algorithms in view of this disclosure. Further, the operations to determine costs or other factors herein may be performed over one or a plurality of time steps and examples herein are not limited in the number of time steps utilized.

The computing device may then determine a local maxima score for the calibrated extrinsics based on the costs of the perturbed extrinsics of the set of perturbed extrinsics and the cost of the calibrated extrinsics. In some examples, the local maxima score may be associated with the number of perturbed extrinsics of the set of perturbed extrinsics whose cost is less than the cost of the calibrated extrinsics. For example, the local maxima score may represent the percentage of perturbed extrinsics of the set of perturbed extrinsics whose cost is less than the cost of the calibrated extrinsics.

The computing device may then determine a probability that the camera is miscalibrated based on the local maxima score of the calibrated extrinsics. In some examples, the likelihood that the camera is miscalibrated may be determined as a Bayes probability following the Bayes rule utilizing the calculated local maxima score distributions for calibrated and miscalibrated extrinsics from training data. Based on the determined likelihood that the camera is miscalibrated, the calibrated extrinsics may be accepted or rejected. A camera whose calibrated extrinsics are rejected may be recalibrated.

The miscalibration detection techniques described herein can improve a functioning of a computing device by providing a robust method of determining a likelihood that a sensor is miscalibrated. For example, determining whether a sensor is properly calibrated can allow subsequent processes associated with an autonomous vehicle (e.g., classification, tracking, prediction, route planning, trajectory generation, and the like) to be performed more accurately, may require less processing power, and/or may require less memory. In some examples, the techniques can be used in a self-test operation associated with a system to evaluate a performance of the system which provides for greatly improved overall reliability and safety outcomes. Further, the techniques discussed herein may be incorporated into a system that can be validated for safety. These and other improvements to the functioning of the computing device are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is an illustration of an example diagram 100 in which an example camera miscalibration detection component 102 may determine a probability a sensor is miscalibrated. For instance, a computing device can implement the camera miscalibration detection component 102 to validate the calibration of a camera to a lidar (e.g., calibrated extrinsics). The camera miscalibration detection component 102 may include an extrinsic perturbation component 104, a perturbed extrinsics cost calculation component 106, a local maxima score calculation component 108, and a miscalibration probability estimation component 110. While the example illustrated and discussed with respect to FIGS. 1-5 as related to validating a calibration of a camera to a lidar, examples are not so limited and other examples may relate to validating the calibration of a first sensor to a second sensor. In some examples, the first sensor can be the same type as the second sensor or a different type of sensor. Such sensors may include, but are not limited to, an image sensor, a lidar sensor, a time-of-flight sensor, a radar sensor, a sonar sensor, and the like. Further, while the example camera miscalibration detection component 102 of FIG. 1 may validate the calibration of a camera to a lidar, other examples may operate to validate the calibration of a plurality of first sensors to a second sensor or sensors, in series or in parallel.

In operation, the extrinsic perturbation component 104 of the camera miscalibration detection component 102 may receive calibrated extrinsics 112 of a camera. In some examples, the calibrated extrinsics 112 for the camera may include multiple dimensions such as roll, pitch, and yaw Euler angle rotations and/or the x, y, and z translations between the camera and another sensor (e.g., lidar) and/or a common reference point/origin. In some examples, some dimensions of the camera extrinsics may be known or predetermined. For example, the translations between a camera and a lidar may be known and may not need to be calibrated (e.g., the relative location of the camera and the lidar may be fixed).

The extrinsic perturbation component 104 of the camera miscalibration detection component 102 may generate a set of perturbed extrinsics 114(1)-114(N) based on the calibrated extrinsics 112 of the camera. For example, to validate the roll (r), pitch (p), and yaw (y) Euler angle rotations of the calibrated extrinsics, the set of perturbed extrinsics may include combinations of the extrinsics varied over a range with a given step size. In an example, the perturbed extrinsics may combinations of extrinsics over a ±1 degree range for the dimensions of [r, p, y], with a 0.1 degree step size, though any other range or step size is contemplated. An example data flow for determining perturbed extrinsics is illustrated in FIG. 2.

Figure 2:
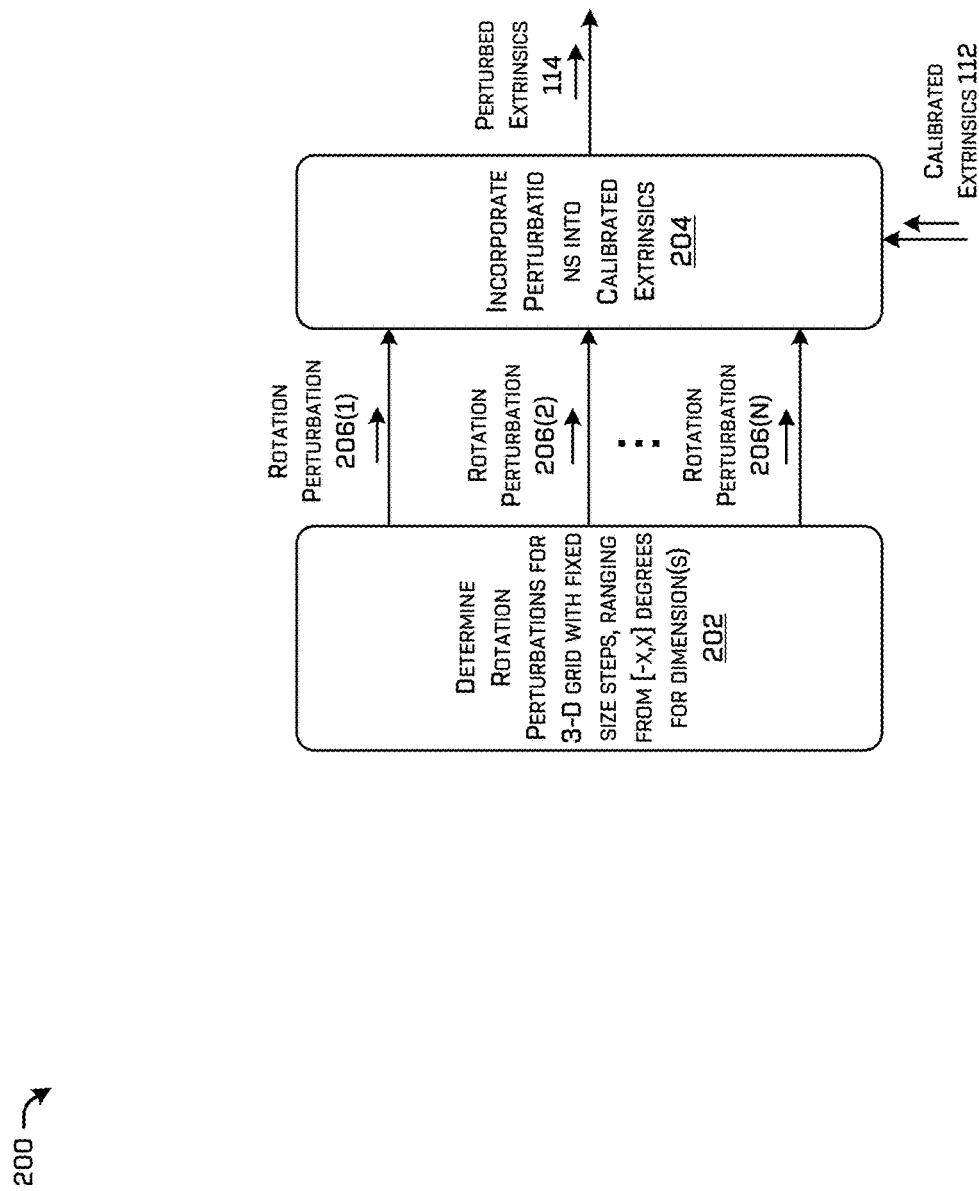
FIG. 2 is an illustration of an example data flow of an extrinsic perturbation component which may generate a set of perturbed extrinsics based on the calibrated extrinsics of a camera.

FIG. 2 is an illustration of an example data flow 200 of an extrinsic perturbation component 104 which may generate a set of perturbed extrinsics 114 based on the calibrated extrinsics 112 of a camera. More particularly, the extrinsic perturbation component of FIG. 2 may operate to generate perturbed extrinsics for three angular dimensions of the calibrated extrinsics (e.g., roll (r), pitch (p), and yaw (y) Euler angle rotations of the calibrated extrinsics). However, other examples may operate based on fewer, additional and/or alternative dimensions of the calibrated extrinsics 112 (e.g., translation).

At 202, the extrinsic perturbation component 104 may determine rotation perturbations 206(1)-206(N) to be applied to the calibrated extrinsics 112 to generate the perturbed extrinsics. For example, the extrinsic perturbation component 104 may generate rotation perturbations 206 for a 3D grid with fixed size steps (w), ranging from [−x, x] degrees for each dimension of the three dimensions [r, p, y]. In the previously discussed example including a range of ±1 degree range for the dimensions of [r, p, y], with a 0.1 degree step size, the extrinsic perturbation component 104 may generate $21^3-1$ rotation perturbations 206.

At 204, the extrinsic perturbation component 104 may incorporate the rotation perturbations 206(1)-206(N) into the calibrated extrinsics 112 to generate the perturbed extrinsics 114. In some examples, the rotation perturbations may be incorporated into the calibrated extrinsics by adding the dimensions of the rotation perturbations to the corresponding dimensions of the calibrated extrinsics (e.g., [r+$r_e$, p+$p_e$, y+$y_e$]).

As mentioned above, the extrinsic perturbation component 104 may operate with respect to other set of extrinsics. In such an example, the extrinsic perturbation component 104 may generate perturbations for an n-dimensional grid with fixed size steps (w), ranging from [−x, x] of the dimension of the calibrated extrinsics for each dimension of N dimensions. Further, examples are not limited to n-dimensional grids with fixed size steps (w), ranging from [−x, x] of the dimension of the calibrated extrinsics for each dimension of n dimensions. For example, the set of perturbations 206 may be limited to perturbations 206 with a distance value T≤1 where:

$$T=\sqrt{r_e^2+p_e^2+y_e^2}$$

where $r_e$, $p_e$, and $y_e$ may be the perturbation to be applied to the roll (r), pitch (p), and yaw (y) Euler angle rotations of the calibrated extrinsics. In such a case, the set of perturbations 206 may resemble a spherical shape if arranged in a 3D grid around the calibrated extrinsics. These and other variations would be apparent to one of ordinary skill in the art in view of this disclosure.

Returning to FIG. 1, the perturbed extrinsics cost calculation component 106 may receive the perturbed extrinsics 114(1)-114(N) and camera calibration data 116 and determine respective costs of the perturbed extrinsics 118 based thereon.

The camera calibration data 116 may include data used in calibration of the camera, which may be raw or processed. For example, the camera calibration data 116 for calibration of the camera with a lidar may include lidar-camera factors data. Lidar-camera factors data may include one or more camera edgemap images and corresponding lidar edges (e.g., depth discontinuities). Alternatively, the camera calibration data 116 for calibration of a camera with a lidar may be one or more camera images and raw laser data that covers a field of view at least partially overlapping the camera's field of view.

In some examples, the cost determination may be the same as the cost determination of the calibrated extrinsics during calibration. For example, the cost determination between a camera and a lidar may be determined based on distance between edges in camera edgemap images and the corresponding lidar depth discontinuities when the pixels of the edges in the camera edgemap images are offset by the roll (r), pitch (p), and yaw (y) Euler angle rotations of the perturbed extrinsics 114.

The local maxima score calculation component 108 of the computing device may then determine a local maxima 120 based on the costs of the perturbed extrinsics 118 and the cost of the calibrated extrinsics. In some examples, the local maxima score 120 may be associated with the number of perturbed extrinsics 114(1)-114(N) whose cost is less than the cost of the calibrated extrinsics. For example, the local maxima score 120 may represent the percentage of perturbed extrinsics 114(1)-114(N) whose cost is less than the cost of the calibrated extrinsics. In an example, the local maxima score for the calibrated extrinsics may be determined as:

$$LMS_X = \frac{\sum_{i=1}^{N} 1(Cost_{x_i} < Cost_X)}{N}$$

where N is the total number of sets of perturbed extrinsics, X is the calibrated extrinsics, $Cost_{x_i}$ represents the cost for the i-th set of perturbed extrinsics $x_i$, $Cost_X$ represents the cost of the calibrated extrinsics X, and $1(Cost_{x_i} < Cost_X) = 1$ if $Cost_{x_i} < Cost_X$, and 0 otherwise.

The miscalibration probability estimation component 110 may determine a probability 124 that the camera is miscalibrated based on the local maxima score. In some examples, the probability 124 that the camera is miscalibrated may be determined as a Bayes probability following the Bayes rule utilizing local maxima score distributions for calibrated and miscalibrated extrinsics from training data. More particularly, the probability 124 that the camera is miscalibrated may be determined as:

$$P(miscalib) = \frac{P(LMS_X \mid miscalib) * P(miscalib)}{\left(\begin{array}{c} P(LMS_X \mid miscalib) * P(miscalib) + \\ P(LMS_X \mid calib) \times P(calib) \end{array}\right)}$$

where $LMS_X$ is the local maxima score for the calibrated extrinsics, a priori probabilities may be considered equally likely such that P(calib)=P(miscalib)=0.5. Of course, other a priori probability likelihoods may be utilized. As used herein, a "probability that the camera is miscalibrated" may also be a probability the camera is well-calibrated or a probability the camera is not miscalibrated, with modifications that would be understood by one of ordinary skill in the art accommodate the alternative form of the "probability that the camera is miscalibrated."

As mentioned above, the miscalibration probability estimation component 110 may utilize a local maxima score distribution for calibrated extrinsics and a local maxima score distribution for miscalibrated extrinsics. The local maxima score distributions may be determined based on training data. More particularly, a computing device may generate local maxima score distributions based on one or more logs of well-calibrated extrinsics. The computing device may generate sample perturbed extrinsics around the logged well-calibrated extrinsics. As discussed above, the sample perturbed extrinsics may include an n-dimensional grid of extrinsics centered on the well-calibrated extrinsics with fixed size steps (w), ranging from [−x, x] degrees for each dimension of n dimensions or another set of extrinsics surrounding the well-calibrated extrinsics. Local maxima scores may be determined for the sample perturbed extrinsics. The sample perturbed extrinsics may then be differentiated into sample perturbed extrinsics that are associated with calibrated extrinsics and sample perturbed extrinsics that are associated with miscalibrated extrinsics. In some examples, a threshold error magnitude from the well-calibrated extrinsics may be utilized. In a first example, sample perturbed extrinsics having a maximum of 0.1 degree perturbation on any rotation dimension from the known well-calibrated extrinsics may be considered as calibrated extrinsics. In second example, sample perturbed extrinsics having a geometric distance from the well-calibrated extrinsics over the n dimensions of 0.1 degrees or less may be considered as calibrated extrinsics (e.g., using the n-dimensional version of Pythagoras theorem). Sample perturbed extrinsics which are not determined as calibrated extrinsics may be considered miscalibrated extrinsics.

In another example, the selection of sample perturbed extrinsics around the logged well-calibrated extrinsics considered as calibrated extrinsics may be adaptive or based on a threshold local maxima score. Such an example is shown in FIG. 3.

Figure 3:
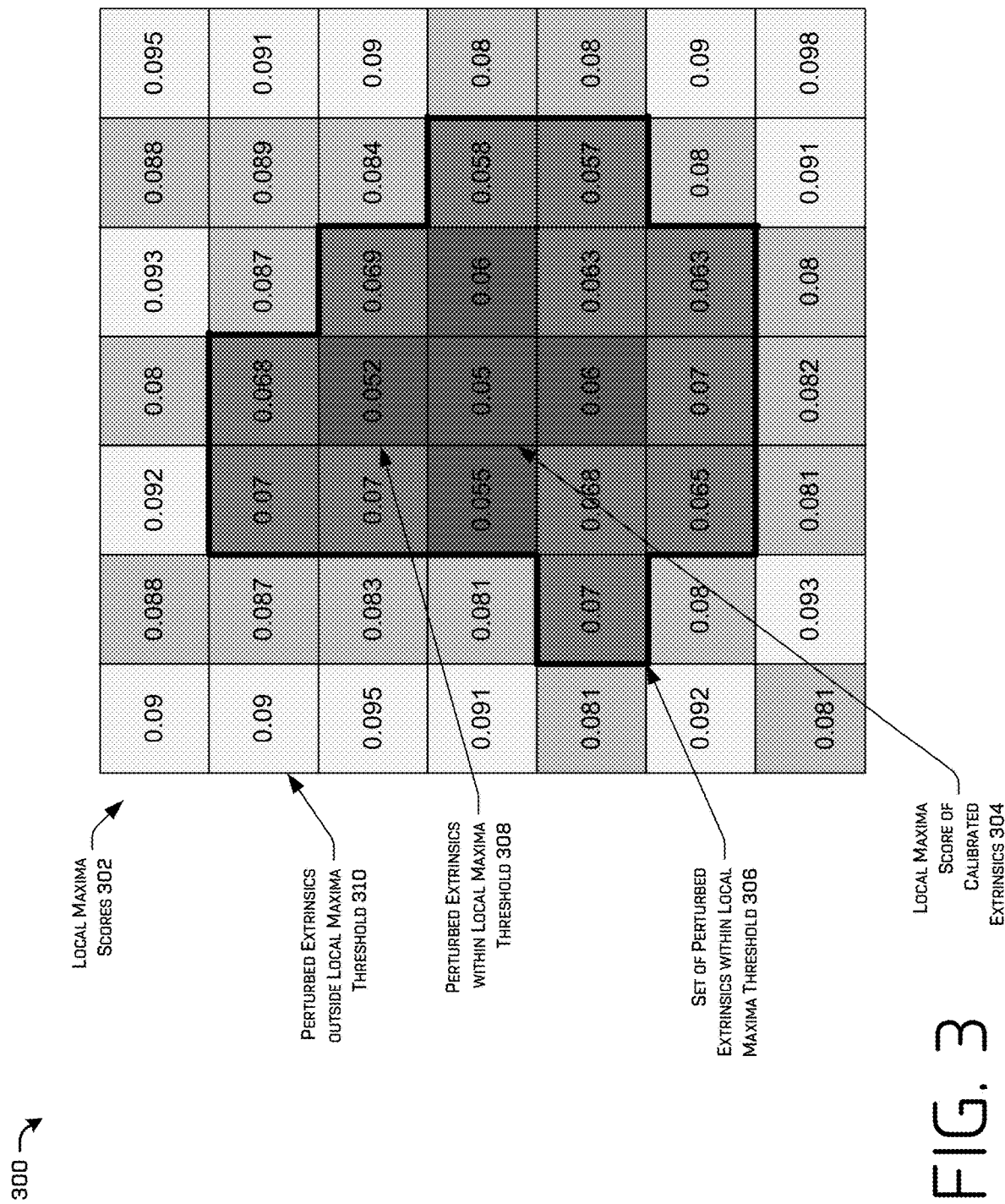
FIG. 3 illustrates an example of the local maxima scores of sampled perturbed extrinsics for known well calibrated extrinsics.

FIG. 3 illustrates an example 300 of the local maxima scores 302 of sampled perturbed extrinsics for known well calibrated extrinsics 304. More particularly, the example 300 illustrates a two-dimensional perturbation of the well calibrated extrinsics 304. As illustrated, the selection may determine a set of perturbed extrinsics 306 with local maxima scores within a local maxima threshold of 0.7 or less, such as perturbed extrinsics 308. In some examples, the set of perturbed extrinsics 306 with local maxima scores within the local maxima threshold may be considered as calibrated extrinsics. The other perturbed extrinsics with local maxima scores outside the local maxima threshold, such as perturbed extrinsics 310, may be considered as miscalibrated extrinsics. As should be apparent from this FIG. 3, the local maxima scores resultant from such perturbations may be non-uniform and, as such, are able to provide a better representation of what a well-calibrated sensor may look like as opposed to simply picking a fixed radius.

In some examples, the determination of perturbed extrinsics as calibrated extrinsics may consider multiple sets of local maxima scores 302 of sampled perturbed extrinsics for known well calibrated extrinsics 304 when determining calibrated and miscalibrated extrinsics. For example, for three sets of local maxima scores 302 of sampled perturbed extrinsics for known well calibrated extrinsics 304 (e.g., for different logs), the sets of perturbed extrinsics 306 with local maxima scores within a local maxima threshold of 0.7 or less may be determined. The selection process may determine, for each perturbation, the probabilities of the resulting local maxima score being within the local maxima threshold of 0.7 or less in the three sets. For example, a perturbation whose local maxima score was within the local maxima threshold of 0.7 or less in two out of three sets of local maxima scores 302, the probability of the perturbed extrinsics for the perturbation being identified as calibrated extrinsics is 66%. The perturbed extrinsics to be considered as calibrated extrinsics may then be determined based on a probability threshold. For example, where the probability threshold is 60%, the perturbed extrinsics for the perturbations which are identified as calibrated in two of the three or three of the three sets of local maxima scores 302 may be determined as calibrated extrinsics.

As mentioned above, while FIG. 3 illustrates a selection process for two dimensions of perturbed extrinsics, examples are not so limited and additional dimensions of the extrinsics may be included.

The local maxima scores of the sample perturbed extrinsics considered as calibrated extrinsics may then be utilized to generate a local maxima score distribution for calibrated extrinsics and the local maxima scores of the sample perturbed extrinsics considered as miscalibrated extrinsics may be utilized to generate a local maxima score distribution for miscalibrated extrinsics. In some examples, the local maxima score distribution for calibrated extrinsics and the local maxima score distribution for miscalibrated extrinsics may be generated as kernel density estimation (KDE) distribution.

While the above examples may utilize the Bayes rule and example values such as 0.1 degree thresholds, implementations are not so limited and other variations are possible. For example, in some implementations, values for the probability that the camera is miscalibrated may be predetermined for possible values of the local maxima score and stored in a look up table (e.g., for 10,000 values of the local maxima score) and the probability stored for the nearest lookup table entry to the current local maxima score may be used. These and other variations would be apparent to one of ordinary skill in the art in view of this disclosure.

Figure 4:
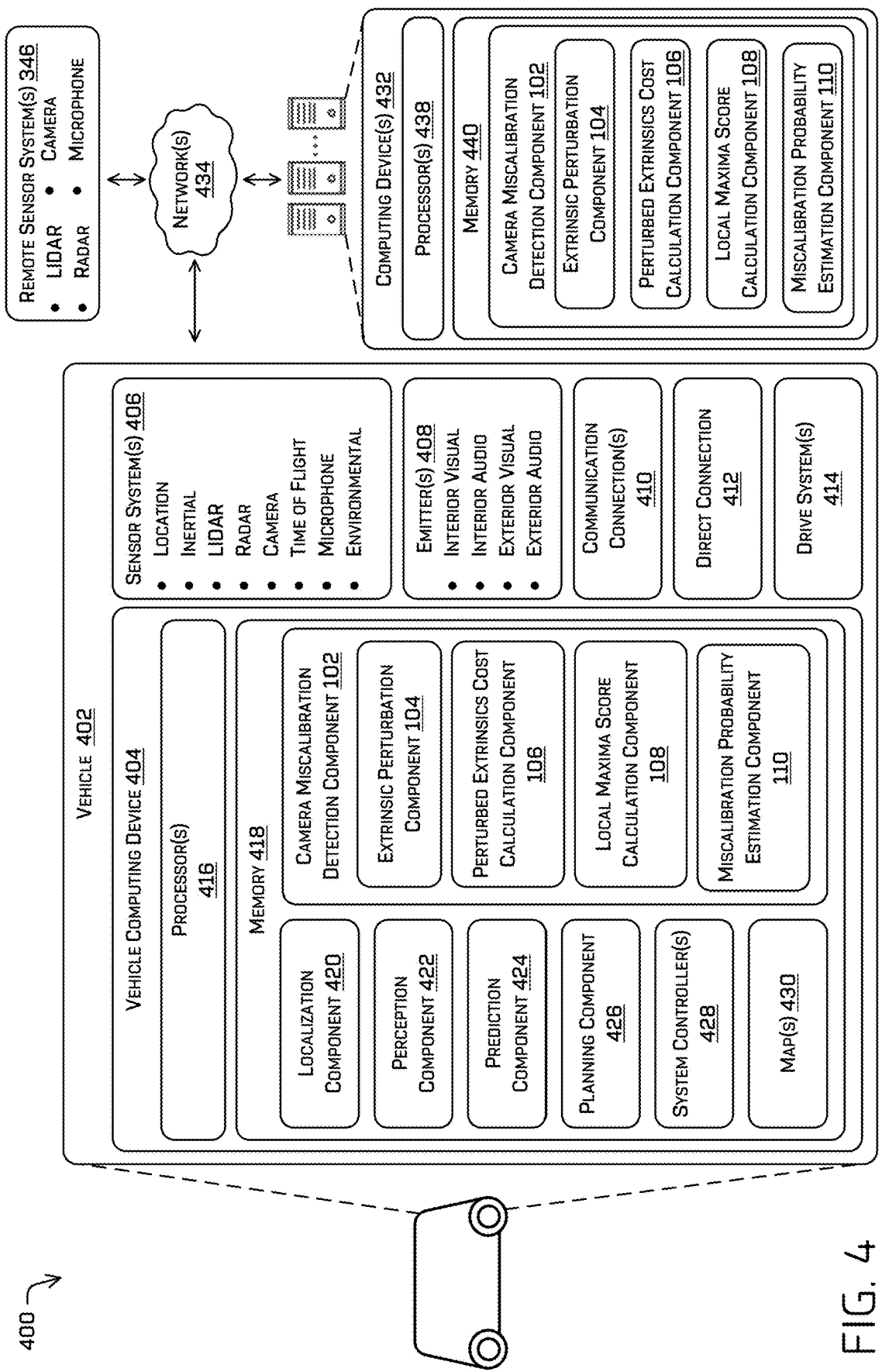
FIG. 4 is a block diagram of an example system for implementing the techniques described herein.

FIG. 4 is a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., a remote teleoperation computing device) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 434 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a localization component 420, a perception component 422, a prediction component 424, a planning component 426, one or more system controllers 428, one or more maps 430, and a camera miscalibration detection component 102 including an extrinsic perturbation component 104, a perturbed extrinsics cost calculation component 106, a local maxima score calculation component 108, and a miscalibration probability estimation component 110. Though depicted as residing in the memory 418 for illustrative purposes, it is contemplated that the localization component 420, the perception component 422, the prediction component 424, the planning component 426, the one or more system controllers 428, the one or more maps 430, the camera miscalibration detection component 102, the extrinsic perturbation component 104, the perturbed extrinsics cost calculation component 106, the local maxima score calculation component 108, and the miscalibration probability estimation component 110 may additionally, or alternatively, be accessible to the vehicle 402 (e.g., stored on, or otherwise accessible by, memory remote from the vehicle 402, such as, for example, on memory 440 of a remote computing device 432).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or a remote map component, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle.

In some examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 432) accessible via network(s) 434. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include the camera miscalibration detection component 102 configured to validate the calibration of a camera to a lidar (e.g., calibrated extrinsics), including determining a probability the camera is miscalibrated (e.g., for the camera of the sensor system(s) 406). In various examples, the camera miscalibration detection component 102 may receive sensor data, vehicle data, and the like from the perception component 422 and/or from the sensor system(s) 406. While shown separately in FIG. 4, the camera miscalibration detection component 102 could be part of the prediction component 424, the planning component 426, or other component(s) of the vehicle 402.

In various examples, the camera miscalibration detection component 102 can perform a miscalibration detection operation to determine if a camera or other sensor of the vehicle 402 is miscalibrated as discussed above with respect to FIGS. 1 and 2.

In some examples, the vehicle 402 may send sensor data to the computing device(s) 432 via the network(s) 434. In some examples, the vehicle 402 may receive sensor data from the computing device(s) 432 and/or remote sensor system(s) 436 via the network(s) 434. The sensor data may include raw sensor data and/or processed sensor data and/or representations of sensor data. In some examples, the sensor data (raw or processed) may be sent and/or received as one or more log files. In one example, the sensor data can correspond to the vehicle data and can include historical calibration scores for one or more sensors.

The computing device(s) 432 may include processor(s) 438 and a memory 440 storing a camera miscalibration detection component 102 including the extrinsic perturbation component 104, the perturbed extrinsics cost calculation component 106, the local maxima score calculation component 108, and the miscalibration probability estimation component 110. In various examples, the camera miscalibration detection component 102 may be configured to receive data from one or more remote sensors, such as the sensor system(s) 406 and/or remote sensor system(s) 436. In some examples, the camera miscalibration detection component 102 may be configured to process the data and send processed sensor data to the vehicle computing device 404, such as for use by the perception component 422, the prediction component 424, and/or the planning component 426. In some examples, the camera miscalibration detection component 102 may be configured to determine a likelihood a camera of the sensor system(s) 406 and/or remote sensor system(s) 436 is miscalibrated.

As can be understood, the components discussed herein (e.g., the camera miscalibration detection component 102, the extrinsic perturbation component 104, the perturbed extrinsics cost calculation component 106, the local maxima score calculation component 108, and the miscalibration probability estimation component 110) are described as divided for illustrative purposes. However, the operations performed by the various components may be combined or performed in any other component.

Determinations by the camera miscalibration detection component can be used by various components of the vehicle computing device 404. For example, likelihood the camera is miscalibrated can be used to cause the vehicle 402 to take an action (e.g., a relatively low score can cause a recalibration of the camera, stopping of the vehicle, downweighting sensor values from the sensors, taking more conservative maneuvers, changing direction of the vehicle, and the like).

While examples are given in which the techniques described herein are implemented by a camera miscalibration detection component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 416 of the computing device 404 and the processor(s) 438 of the computing device(s) 432 can be any suitable processor capable of executing instructions to process data and perform operations as described herein. By way of example and not limitation, the processor(s) 416 and the processor(s) 438 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 of the vehicle computing device 404 and the memory 440 of the computing device(s) 432 are examples of non-transitory computer-readable media. The memory 418 and the memory 440 can store an operating system and one or more software applications, instructions, programs, and/or data to implement the methods described herein and the functions attributed to the various systems. In various implementations, the memory 418 and 440 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Accordingly, the techniques discussed herein provide a robust implementation of determine a probability that a first sensor is miscalibrated with respect a second sensor (e.g., such as whether a camera is well-aligned with a lidar) to allow the safe operation of an autonomous vehicle.

It should be noted that while FIG. 4 is illustrated as a distributed system, in alternative examples, components of the vehicle 402 may be associated with the computing device(s) 432 and/or components of the computing device(s) 432 may be associated with the vehicle 402. That is, the vehicle 402 may perform one or more of the functions associated with the computing device(s) 432, and vice versa.

Figure 5:
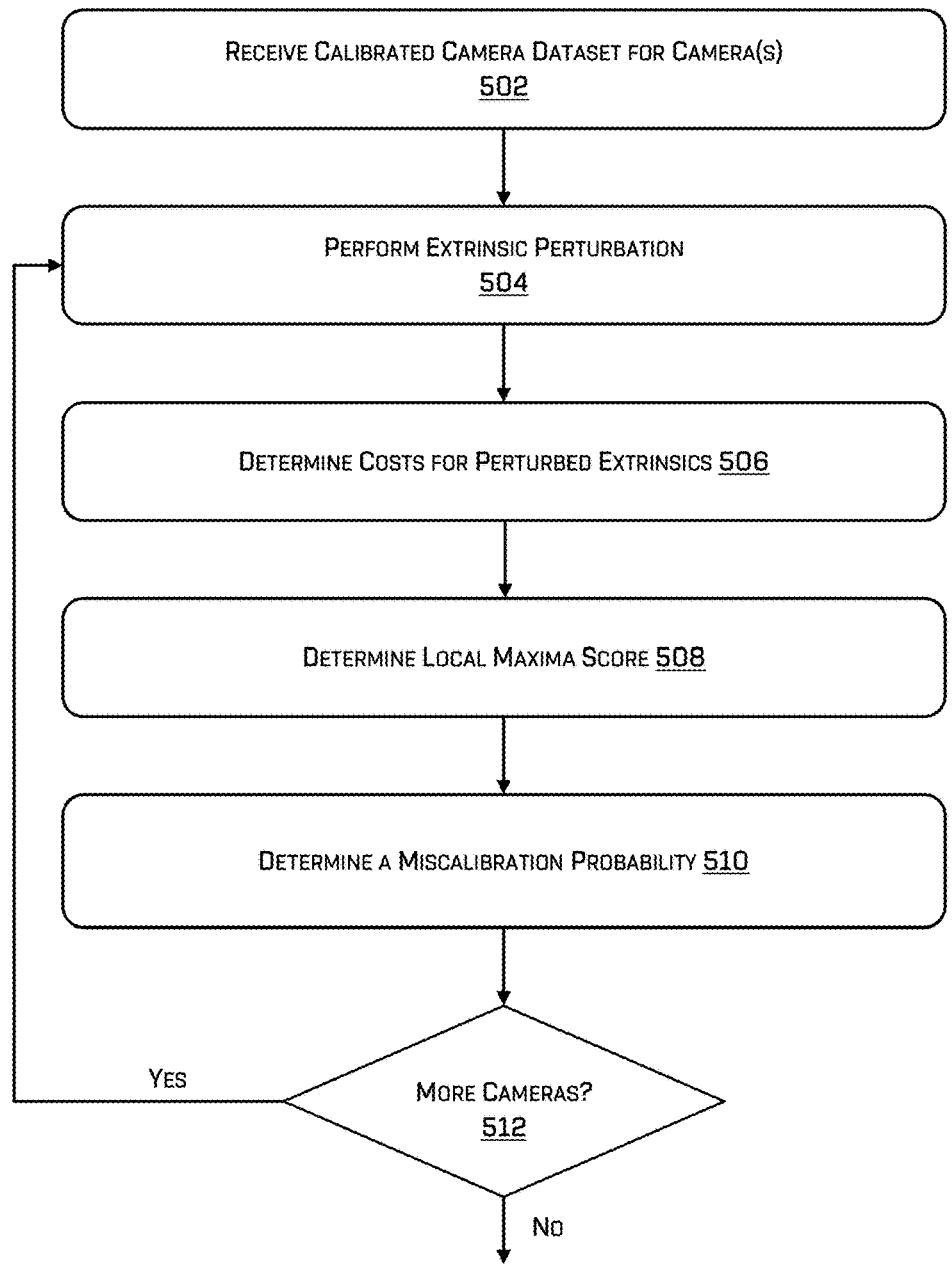
FIG. 5 is an example process for determining probabilities that one or more cameras are miscalibrated.

FIG. 5 is an example process 500 for determining probabilities that one or more cameras are miscalibrated with respect to a lidar. For example, some or all of the process 500 can be performed by one or more components in FIGS. 1-4, as described herein. For example, some or all of the process 500 can be performed by the camera miscalibration detection component 102.

At operation 502, the process can include receiving a calibrated camera dataset for one or more cameras. In some examples, the calibrated camera dataset can include calibrated extrinsics and camera calibration data for the camera(s).

At operation 504, the process can include performing, for a current camera, extrinsic perturbation. Extrinsic perturbation may include generating a set of perturbed extrinsics based on the calibrated extrinsics of the current camera. As discussed above, the set of perturbed extrinsics may include a set of perturbed extrinsics centered on the calibrated extrinsics.

At operation 506, the process can include determining costs for respective sets of perturbed extrinsics. At operation 508, the process can include determining a local maxima score for the calibrated extrinsics based on the cost of the calibrated extrinsics and the costs of the sets of perturbed extrinsics. In some examples, the local maxima score may be determined based on the number of sets of perturbed extrinsics whose cost is less than the cost of the calibrated extrinsics. At operation 510, the process can include determining a miscalibration probability for the calibrated extrinsics. As discussed above, the process 500 may determine the probability that the camera is miscalibrated as a Bayes probability following the Bayes rule utilizing local maxima score distributions for calibrated and miscalibrated extrinsics.

At operation 512, the process can include determining if a camera remains with calibrated extrinsics that have not yet been validated. If so, the process 500 can continue to operation 504. Otherwise, the process 500 may complete. Following process 500, camera(s) associated with calibrated extrinsics determined to be miscalibrated may be recalibrated. Otherwise, the calibrated extrinsics may be utilized in operation, for example, of an autonomous vehicle as discussed with regard to FIG. 7.

Figure 6:
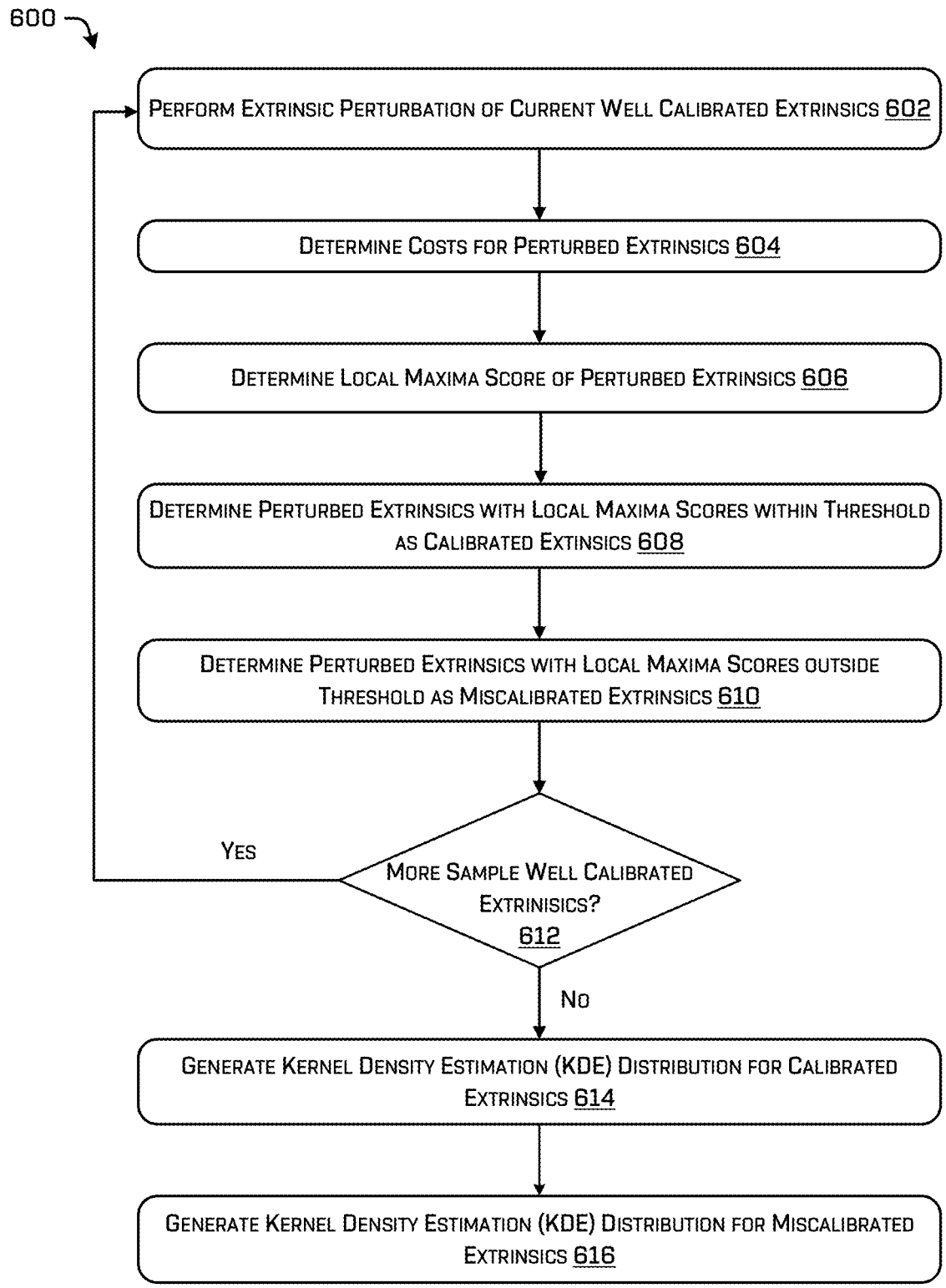
FIG. 6 is an example process for determining distributions of calibrated extrinsics and miscalibrated extrinsics

FIG. 6 is an example process 600 for determining distributions of calibrated extrinsics and miscalibrated extrinsics. For example, some or all of the process 600 can be performed by one or more components in FIGS. 1-2 and 4, as described herein. For example, some or all of the process 600 can be performed by the camera miscalibration detection component 102.

At operation 602, the process can include performing extrinsic perturbation of a current well calibrated extrinsics. Extrinsic perturbation may include generating a set of perturbed extrinsics based on the calibrated extrinsics of the current camera. The set of perturbed extrinsics may include a set of perturbed extrinsics centered on the well calibrated extrinsics.

At operation 604, the process can include determining costs for respective sets of perturbed extrinsics. At operation 606, the process can include determining respective local maxima scores for individual ones of the sets of perturbed extrinsics based on the cost of the individual set and the costs of other sets of perturbed extrinsics centered on the individual set and/or the cost of the well calibrated extrinsics. For example, the local maxima scores 302 illustrated in FIG. 3 may result from operation 606. In some examples, the local maxima scores may be determined based on the number of other sets of perturbed extrinsics whose cost is less than the cost of the individual set in a similar manner to the determination of the local maxima score of the calibrated extrinsics discussed above with regard to FIGS. 1 and 2.

At operation 608, the process can include determining perturbed extrinsics with local maxima scores within a threshold as calibrated extrinsics. For example, the set of perturbed extrinsics 308 with local maxima scores within the local maxima threshold illustrated in FIG. 3 may be identified by operation 608 as calibrated extrinsics. At operation 610, the process can include determining the other perturbed extrinsics with local maxima scores outside the threshold as miscalibrated extrinsics. For example, the perturbed extrinsics 310 with a local maxima score outside the local maxima threshold illustrated in FIG. 3 may be identified by operation 610 as miscalibrated extrinsics.

At operation 612, the process can include determining if additional well calibrated extrinsics remain to be processed in operations 602-610. If so, the process 600 can return to operation 602. Otherwise, the process 600 may continue to operation 614.

At operation 614, the process can include generating a Kernel Density Estimation (KDE) distribution for the calibrated extrinsics determined for the well calibrated extrinsics in operations 602-610. Then, at operation 616, the process can include generating a Kernel Density Estimation (KDE) distribution for the miscalibrated extrinsics determined for the well calibrated extrinsics in operations 602-610.

Following process 600, the distribution of calibrated extrinsics and distribution of miscalibrated extrinsics may be utilized in, for example, process 500 to determine probabilities that one or more cameras are miscalibrated with respect to a lidar.

Figure 7:
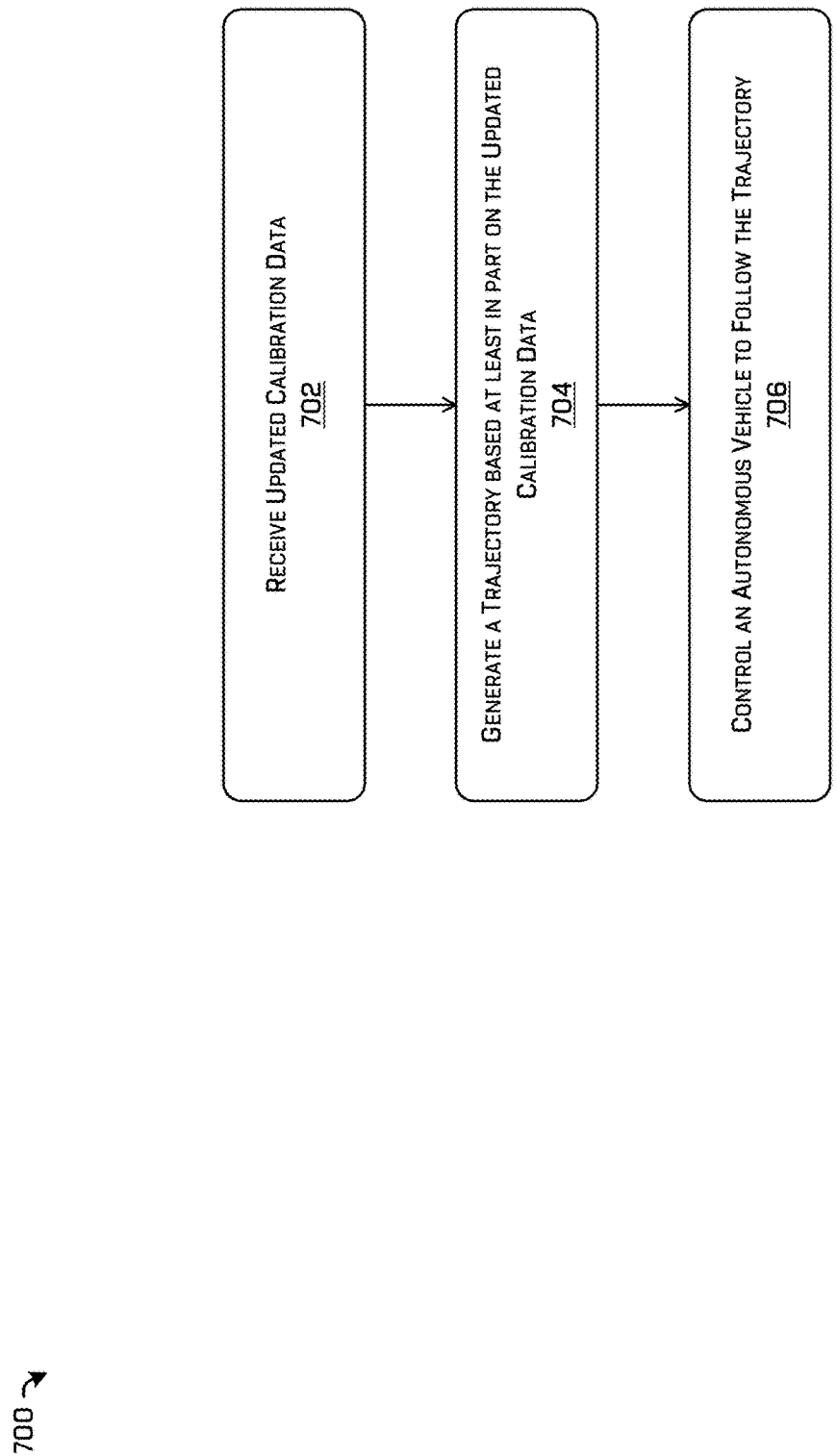
FIG. 7 is an example process for controlling an autonomous vehicle based at least in part on calibrated extrinsics for a camera.

FIG. 7 is an example process 700 for controlling an autonomous vehicle based at least in part on calibrated extrinsics for a camera, as discussed herein. For example, some or all of the process 700 can be performed by one or more components in FIGS. 1 and 3, as described herein. For example, some or all of the process 700 can be performed by the localization component 420, the perception component 422, the prediction component 424, the planning component 426, and/or the one or more system controllers 428.

At operation 702, the process can include receiving calibration data including calibrated extrinsics. In some instances, the calibrated extrinsics can be determined and validated using the calibration techniques discussed herein (e.g., such as in FIG. 5 above).

At operation 704, the process can include generating a trajectory based at least in part on the calibration data. For example, the trajectory generated in the operation 704 may be based at least in part on sensor data received from one or more sensors calibrated using the calibration data. In some instances, the trajectory can be based on a presence of objects or agents external to an autonomous vehicle in an environment.

At operation 706, the process can include controlling an autonomous vehicle to follow the trajectory. In some instances, the commands generated in the operation 706 can be relayed to a controller onboard an autonomous vehicle to control the autonomous vehicle to drive the trajectory. Although discussed in the context of an autonomous vehicle, the process 700, and the techniques and systems described herein, can be applied to a variety of systems utilizing machine vision.

FIGS. 5-7 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples described herein.

A. A system comprising: one or more processors; and one or more non-transitory computer readable media storing computer executable instructions that, when executed, cause the one or more processors to perform operations comprising: receiving current extrinsics of a camera relative to a lidar associated with an autonomous vehicle, the current extrinsics comprising a current extrinsic parameter associated with one or more of a roll, pitch, or yaw between the camera and the lidar; determining a set of perturbed extrinsics, a perturbed extrinsic of the set of perturbed extrinsics having a perturbed extrinsic parameter which differs from the current extrinsic parameter by a multiple of a step size and less than or equal to a maximum difference; determining a current cost based on an image from the camera, lidar data from the lidar, and the current extrinsics; determining respective a set of costs associated with the set of perturbed extrinsics based on the image, the lidar data, and the set of perturbed extrinsics; determining, based at least in part on the current cost and the set of costs, a local maxima score for the current extrinsics; and determining a probability that the camera is miscalibrated based on the local maxima score for the current extrinsics and based on a distribution of known other calibrated extrinsics, wherein the distribution of known other calibrated extrinsics is a kernel density estimation distribution and the distribution of known other calibrated extrinsics is based on ground truth extrinsics determined for having respective local maxima scores less than a local maxima score threshold.

B. The system of clause A, wherein the local maxima score for the current extrinsics is associated with a percentage of the set of that are less than the current cost associated with the current extrinsics.

C. The system of clause A, wherein the determining the probability that the camera is miscalibrated is further based on a distribution of known miscalibrated extrinsics that is based on additional ground truth extrinsics determined for having respective local maxima scores greater than or equal to the local maxima score threshold.

D. The system of clause A, wherein determining the probability is further based at least in part on a Bayesian probability and the distribution.

E. The system of clause A, the operations further comprising: determining that the probability that the camera is miscalibrated is below a threshold; and based at least in part on the determining the probability that the camera is miscalibrated is below the threshold, operating the autonomous vehicle based at least in part on the current extrinsics.

F. One or more non transitory computer readable media storing instructions executable by a processor, wherein the instructions, when executed, cause the processor to perform operations comprising: receiving current extrinsics representing a calibration between a first sensor and a second sensor; determining a set of perturbed extrinsics based on the current extrinsics; determining a set of costs associated with the set of perturbed extrinsics based on first data captured by the first sensor, the set of perturbed extrinsics, and second data captured by the second sensor; determining a local maxima score for the current extrinsics based at least in part on the set of costs and a cost associated with the current extrinsics; and determining a probability that the first sensor is miscalibrated based on the local maxima score and based on a previously computed first distribution of first extrinsics associated with good calibrations having respective local maxima scores less than a local maxima score threshold.

G. The one or more non transitory computer readable media of clause F, wherein determining the set of perturbed extrinsics comprises varying a parameter of the current extrinsics by a range of values.

H. The one or more non transitory computer readable media of clause G, wherein the range of values differ by a fixed step size and wherein the first distribution is a kernel density distribution.

I. The one or more non transitory computer readable media of clause G, wherein the parameter comprises one or more of a roll, a pitch, or a yaw between the first and second sensor.

J. The one or more non transitory computer readable media of clause F, wherein the local maxima score is associated with a percentage of the set of costs that are less than the cost of the current extrinsics, and wherein determining the probability comprises determining a Bayes probability.

K. The one or more non transitory computer readable media of clause F, wherein the determining the probability that the first sensor is miscalibrated is further based on a second distribution of second extrinsics associated with known miscalibrated extrinsics.

L. The one or more non transitory computer readable media of clause F, wherein the first sensor is a camera and the second sensor is a lidar.

M. The one or more non transitory computer readable media of clause F, wherein the first sensor and the second sensor are located on a vehicle, the operations further comprising: determining that the probability that the first sensor is miscalibrated is less than or equal to a threshold; and based at least in part on the determining that the probability that the first sensor is miscalibrated is less than or equal to the threshold, operating the vehicle based at least in part on the current extrinsics.

N. A method comprising: receiving current extrinsics representing a calibration between a first sensor and a second sensor; determining a set of perturbed extrinsics based on the current extrinsics; determining a set of costs associated with the set of perturbed extrinsics based on data captured by the first sensor and the set of perturbed extrinsics; determining a local maxima score for the current extrinsics based at least in part on the set of costs and a cost associated with the current extrinsics; and determining a probability that the first sensor is miscalibrated based on the local maxima score and based on a previously computed first distribution of first extrinsics associated with good calibrations.

O. The method of clause N, wherein determining the set of perturbed extrinsics comprises varying a parameter of the current extrinsics by a range of values.

P. The method of clause O, wherein the range of values differ by a fixed step size.

Q. The method of clause O, wherein the parameter comprises one or more of a roll, a pitch, or a yaw between the first and second sensor, and wherein the first distribution is associated with local maxima scores less than or equal to a threshold maxima score.

R. The method of clause N, wherein the local maxima score is associated with a percentage of the set of costs that are less than the cost of the current extrinsics, and wherein determining the probability comprises determining a Bayes probability.

S. The method of clause N, wherein the determining the probability that the first sensor is miscalibrated is further based on a second distribution of second extrinsics associated with known miscalibrated extrinsics.

T. The method of clause N, wherein the first sensor and the second sensor are located on a vehicle, the method further comprising: determining that the probability that the first sensor is miscalibrated is less than or equal to a threshold; and based at least in part on the determining that the probability that the first sensor is miscalibrated is less than or equal to the threshold, operating the vehicle based at least in part on the current extrinsics.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more non-transitory computer readable media storing computer executable instructions that, when executed, cause the one or more processors to perform operations comprising:
receiving current extrinsics of a camera relative to a lidar associated with an autonomous vehicle, the current extrinsics comprising a current extrinsic parameter associated with one or more of a roll, pitch, or yaw between the camera and the lidar;

determining a set of perturbed extrinsics, a perturbed extrinsic of the set of perturbed extrinsics having a perturbed extrinsic parameter which differs from the current extrinsic parameter by a multiple of a step size and less than or equal to a maximum difference;

determining a current cost based on an image from the camera, lidar data from the lidar, and the current extrinsics;

determining a set of costs associated with the set of perturbed extrinsics based on the image, the lidar data, and the set of perturbed extrinsics;

determining, based at least in part on the current cost and the set of costs, a local maxima score for the current extrinsics;

receiving, as a distribution of calibrated extrinsics, a kernel density estimation distribution of a set of calibrated extrinsics, a calibrated extrinsic of the set of calibrated extrinsics having a local maxima score less than a local maxima score threshold;

determining a probability that the camera is miscalibrated based on the local maxima score for the current extrinsics and the distribution of calibrated extrinsics; and based at least in part on determining that the probability that the camera is miscalibrated is below a threshold, operating the autonomous vehicle based at least in part on the current extrinsics.

2. The system of claim 1, wherein the local maxima score for the current extrinsics is associated with a percentage of the set of costs that are less than the current cost associated with the current extrinsics.

3. The system of claim 1, wherein determining the probability that the camera is miscalibrated is further based on a distribution of known miscalibrated extrinsics that is based on additional ground truth extrinsics determined for having respective local maxima scores greater than or equal to the local maxima score threshold.

4. The system of claim 1, wherein determining the probability is further based at least in part on a Bayesian probability and the distribution.

5. One or more non-transitory computer-readable media storing instructions executable by a processor, wherein the instructions, when executed, cause the processor to perform operations comprising:

receiving current extrinsics representing a calibration between a first sensor and a second sensor, the first sensor and the second sensor associated with a vehicle;

determining a set of perturbed extrinsics based on the current extrinsics;

determining a set of costs associated with the set of perturbed extrinsics based on first data captured by the first sensor, the set of perturbed extrinsics, and second data captured by the second sensor;

determining a local maxima score for the current extrinsics based at least in part on the set of costs and a cost associated with the current extrinsics;

determining a probability that the first sensor is miscalibrated based on the local maxima score and based on a previously computed first distribution of first extrinsics associated with good calibrations having respective local maxima scores less than a local maxima score threshold; and operating, based at least in part on determining that the probability that the first sensor is miscalibrated is less than or equal to a threshold, the vehicle based at least in part on the current extrinsics.

6. The one or more non-transitory computer-readable media of claim 5, wherein determining the set of perturbed extrinsics comprises varying a parameter of the current extrinsics by a range of values.

7. The one or more non-transitory computer-readable media of claim 6, wherein the range of values differ by a fixed step size and wherein the previously computed first distribution of first extrinsics is a kernel density distribution.

8. The one or more non-transitory computer-readable media of claim 6, wherein the parameter comprises one or more of a roll, a pitch, or a yaw between the first sensor and second sensor.

9. The one or more non-transitory computer-readable media of claim 5, wherein the local maxima score is associated with a percentage of the set of costs that are less than the cost of the current extrinsics, and
wherein determining the probability comprises determining a Bayes probability.

10. The one or more non-transitory computer-readable media of claim 5, wherein determining the probability that the first sensor is miscalibrated is further based on a second distribution of second extrinsics associated with known miscalibrated extrinsics.

11. The one or more non-transitory computer-readable media of claim 5, wherein the first sensor is a camera and the second sensor is a lidar.

12. A method comprising:
receiving current extrinsics representing a calibration between a first sensor and a second sensor, the first sensor and the second sensor associated with a vehicle;

determining a set of perturbed extrinsics based on the current extrinsics;

determining a set of costs associated with the set of perturbed extrinsics based on data captured by the first sensor and the set of perturbed extrinsics;

determining a local maxima score for the current extrinsics based at least in part on the set of costs and a cost associated with the current extrinsics;

determining a probability that the first sensor is miscalibrated based on the local maxima score and based on a previously computed first distribution of first extrinsics associated with good calibrations; and operating, based at least in part on determining that the probability that the first sensor is miscalibrated is less than or equal to a threshold, the vehicle based at least in part on the current extrinsics.

13. The method of claim 12, wherein determining the set of perturbed extrinsics comprises varying a parameter of the current extrinsics by a range of values.

14. The method of claim 13, wherein the range of values differ by a fixed step size.

15. The method of claim 13, wherein the parameter comprises one or more of a roll, a pitch, or a yaw between the first sensor and the second sensor, and
wherein the previously computed first distribution of extrinsics is associated with local maxima scores less than or equal to a threshold maxima score.

16. The method of claim 12, wherein the local maxima score is associated with a percentage of the set of costs that are less than the cost of the current extrinsics, and
wherein determining the probability comprises determining a Bayes probability.

17. The method of claim 12, wherein determining the probability that the first sensor is miscalibrated is further based on a second distribution of second extrinsics associated with known miscalibrated extrinsics.

18. The system of claim 1, wherein determining the set of perturbed extrinsics comprises varying a parameter of the current extrinsics by a range of values.

19. The one or more non-transitory computer-readable media of claim 5, wherein operating the vehicle comprises determining a trajectory for the vehicle to traverse an environment based at least in part on the current extrinsics.

20. The system of claim 1, wherein the camera is associated with camera images with a first field of view that at least partially overlaps a second field of view associated with the lidar data.

* * * * *